B. S. JOHNSON.
FRICTION GEAR.
APPLICATION FILED DEC. 2, 1915.
1,232,321.
Patented July 3, 1917.
2 SHEETS—SHEET 1.
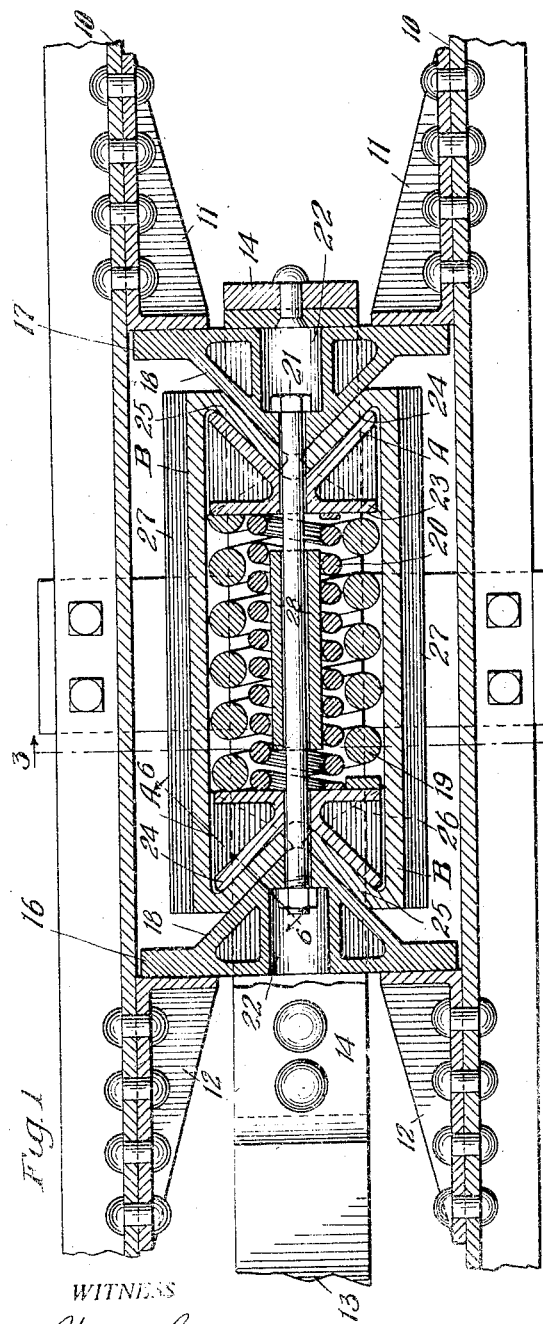
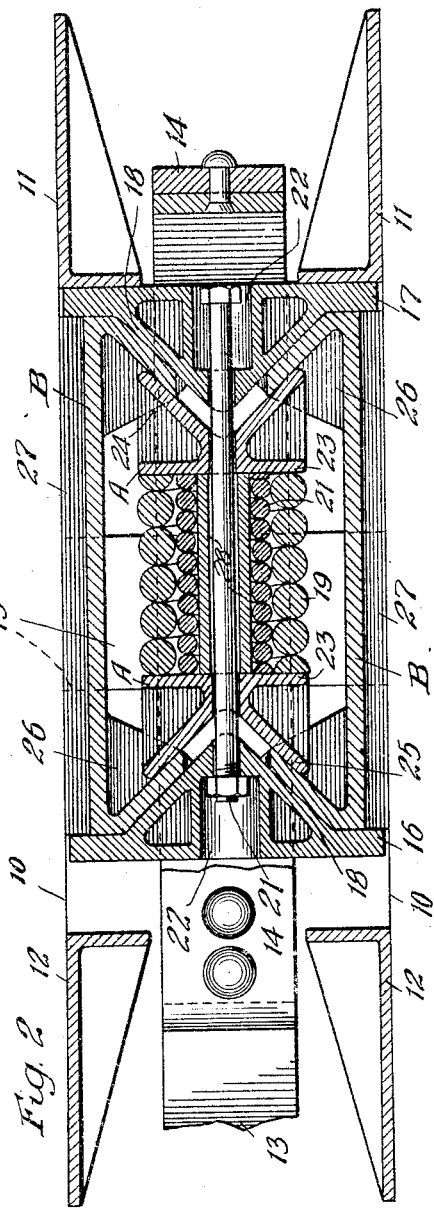
WITNESS
Wm. Geiger
INVENTOR.
Bradley S. Johnson
BY
ATTORNEY

B. S. JOHNSON.
FRICTION GEAR.
APPLICATION FILED DEC. 2, 1915.

1,232,321.

Patented July 3, 1917
2 SHEETS—SHEET 2.

WITNESS
Wm. Geiger

INVENTOR.
Bradley S. Johnson
BY
ATTORNEY

UNITED STATES PATENT OFFICE.

BRADLEY S. JOHNSON, OF CHICAGO, ILLINOIS, ASSIGNOR TO WILLIAM H. MINER, OF CHAZY, NEW YORK.

FRICTION-GEAR.

1,232,321.         Specification of Letters Patent.       Patented July 3, 1917.

Application filed December 2, 1915. Serial No. 64,626.

*To all whom it may concern:*

Be it known that I, BRADLEY S. JOHNSON, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

The object of the invention is to provide a friction gear for railway draft riggings of high capacity and simple arrangement.

Figure 3:
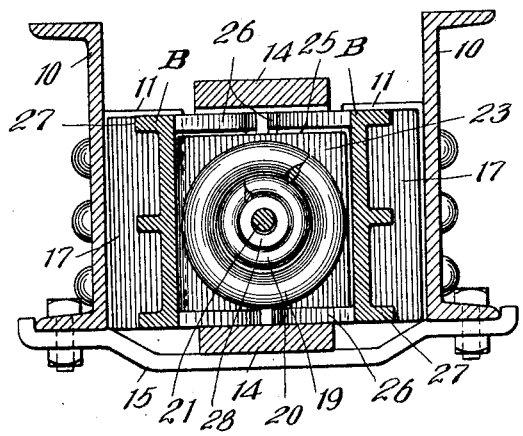
Figure 4:
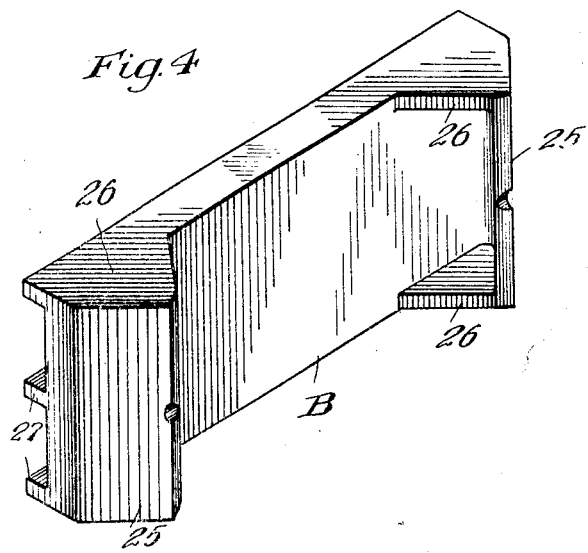
Figure 5:
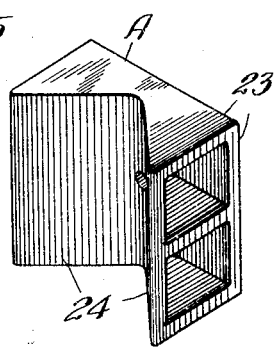
Figure 6:
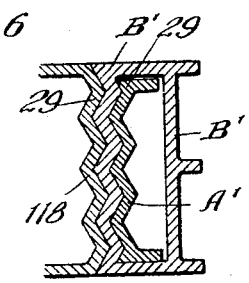

In the drawing forming a part of this specification, Figure 1 is a horizontal, longitudinal sectional view of a draft rigging showing my improvements in connection therewith, the parts being shown in normal or full released position. Fig. 2 is a view similar to Fig. 1 but illustrating the position of the parts under full buff. Fig. 3 is a transverse, sectional view taken substantially on the line 3—3 of Fig. 1. Figs. 4 and 5 are detail perspectives of one of the friction shoes and combined spring follower and wedge, respectively. And Fig. 6 is a detail, sectional view illustrating a modified form of the invention.

In said drawing, 10—10 denote the center sills, the same being provided with rear stops 11 and front stops 12. The coupler 13 is operatively connected with the gear proper, hereinafter described, by a yoke strap 14, the latter encircling the gear and riding upon a saddle plate 15.

The gear proper, as shown, consists of a front follower 16, rear follower 17, each of which is provided on its inner face with an integral wedge 18. Between the followers is mounted a heavy spring consisting of an outer heavy coil 19 and inner lighter coil 20, said spring being arranged longitudinally of the gear and mounted on a longitudinally extending bolt 21, the latter having its ends received in suitable recesses 22 formed in the combined followers and wedges 16—18. At each end of the spring is a combined spring follower and wedge A, see Fig. 5. As shown, each member A is provided with a flat inner face 23 against which the main spring bears, and a pair of diverging wedge faces 24—24 on its outer face, the diverging wedge faces 24—24 being parallel to the adjacent corresponding wedge faces of the wedge 18. Also interposed between the followers 16 and 17 are two friction shoes B—B, see Fig. 4. As shown, each of the shoes B is provided at its ends with diagonally arranged flanges 25, the flanges 25 having parallel inner and outer faces in engagement and coöperating with a wedge face 24 and face of the adjacent wedge 18. For the purpose of strengthening and also to assist in maintaining the parts in proper position, each friction shoe B is provided with upper and lower horizontal flanges 26—26, connecting said flanges 25 with the main portions of the shoes, thereby forming a triangular shaped opening at each end of the shoes B within which is received one end of the coöperating member A. Each of the members B is also preferably provided on its exterior face with a series of longitudinally extending ribs 27—27. As clearly shown in Figs. 1 and 2, a hollow thimble 28 is mounted on the connecting rod or bolt 21, said thimble 28 being adapted to limit the compression of the gear as clearly indicated in Fig. 2.

The normal position of the parts is as shown in Fig. 1. Upon relative approach of the followers 16 and 17, upon either buff or draft, the wedges 18 will force the friction shoes B away from each other or outwardly to the position indicated in Fig. 2, this movement of the friction shoes being resisted by the combined spring followers and wedges A, movement of which is in turn resisted by the main spring. It will be noted that the friction shoes B not only move inwardly and outwardly relatively to the center line of the gear but also have simultaneous bodily movement longitudinally of the gear. Furthermore, it will be seen that the length of the friction shoes B is preferably so designed that the ends of the latter will engage with the followers 16 and 17 simultaneously with the engagement of the members A—A with the hollow thimble 28 to thereby limit the amount of spring compression. Upon release, the parts will return to normal due to the separation of the members A under the influence of the spring and in this action, the shoes B will coöperate with the members A to prevent heavy recoil, and will thus serve as effective dampeners.

The arrangement shown in Fig. 6 corresponds to a section taken on the line 6—6 of Fig. 1 but the wedge faces and coöperating flanges of the friction shoe are corrugated as indicated at 29—29 to thereby increase the areas of the coöperating friction surfaces, it being understood that in said Fig. 6 B' is the friction shoe, A' is the combined spring follower and wedge and 118 is the wedge on the inner side of the main follower of the gear.

Although I have herein shown and described what I now consider the preferred embodiment of my invention, the same is merely illustrative and I contemplate all changes and modifications that come within the scope of the claims appended hereto.

I claim:

1. In a draft rigging, the combination with followers, a spring between said followers, and friction shoes between said followers movable bodily longitudinally and transversely, of wedge means movable with each of said followers, said means coöperating with the shoes and arranged to force said shoes outwardly when the followers approach each other.

2. A friction gear for draft riggings, comprising, followers, a longitudinally arranged spring between said followers, longitudinally extending friction shoes between said followers, the shoes extending along the sides of said spring, said shoes being movable transversely of the gear, and wedge means at each end of said shoes and coöperable with said followers, spring, and shoes arranged to force said shoes outwardly when the followers approach each other.

3. In a friction gear, the combination with end followers, wedges on the inner faces of said followers, a longitudinally arranged spring, wedges at the ends of said spring, of friction shoes having flanges at the ends thereof interposed between said sets of wedges, said shoes being movable away from each other upon relative approach of the followers.

4. In a friction gear for draft riggings, the combination with a longitudinally arranged spring, followers engaging the ends of said spring, diverging wedges associated with and on the outer side of said followers, friction shoes having flanges at their ends coöperating with said wedges, and outer end wedges coöperating with said flanges.

5. In a friction gear for draft riggings, the combination with main followers, wedges on the inner side of said followers and having the wedge faces thereof converging inwardly toward the center of the gear, a longitudinally arranged spring between said followers, and combined spring followers and wedges at the ends of said spring, said wedges having the faces thereof diverging and parallel to the faces of said first named wedges, of friction shoes arranged longitudinally of the gear and having diagonally disposed flanges at the ends thereof interposed between said sets of wedges, said shoes being movable outwardly relative to each other upon relative approach of said main followers.

6. In a friction gear for draft riggings, the combination with main followers, wedges on the inner side of said followers and having the wedge faces thereof converging inwardly toward the center of the gear, a longitudinally arranged spring between said followers, and combined spring followers and wedges at the ends of said spring, said wedges having the faces thereof diverging and parallel to the faces of said first named wedges, of friction shoes arranged longitudinally of the gear and having diagonally disposed flanges at the ends thereof interposed between said sets of wedges, said shoes being movable outwardly relative to each other upon relative approach of said main followers, said shoes having upper and lower webs connecting said flanges with the main body of said shoes, thereby forming interior pockets at the ends of the shoes and within which said combined spring followers and wedges are adapted to be received.

7. In a friction gear for draft riggings, the combination with main followers, wedges on the inner side of said followers and having the wedge faces thereof converging inwardly toward the center of the gear, a longitudinally arranged spring between said followers, and combined spring followers and wedges at the ends of said spring, said wedges having the faces thereof diverging and parallel to the faces of said first named wedges, of friction shoes arranged longitudinally of the gear and having diagonally disposed flanges at the ends thereof interposed between said sets of wedges, said shoes being movable outwardly relatively to each other upon relative approach of said main followers, the ends of said shoes engaging said main followers to limit the compression of the gear.

In witness that I claim the foregoing I have hereunto subscribed my name this 12th day of Nov. 1915.

BRADLEY S. JOHNSON.